UNITED STATES PATENT OFFICE.

CHRISTIAN H. EYERMANN, OF ST. LOUIS, MISSOURI, ASSIGNOR OF TWO-THIRDS TO HERMANN C. G. LUYTIES AND JOHN H. ZWARTS, BOTH OF SAME PLACE.

LOTION.

SPECIFICATION forming part of Letters Patent No. 327,933, dated October 6, 1885.

Application filed July 27, 1885. Serial No. 172,802. (No specimens.)

*To all whom it may concern:*

Be it known that I, CHRISTIAN H. EYERMANN, of the city of St. Louis, in the State of Missouri, have invented a certain new and useful Lotion, of which the following is a specification.

This medical compound is a non-alcoholic fluid preparation of calendula.

In making the preparation, to each twelve ounces of the officinal decoction of calendula, four ounces, by measure, of glycerine, and two drachms of burnt alum are added. The addition of these ingredients destroys all turbidity without in any way affecting the chemical action of the decoction; but if the preparation is kept for any length of time it is liable to become spoiled by fungous growth and souring. To prevent this without the use of alcohol, to each fourteen ounces of the cleared decoction I take of boracic acid two drams, and of crystallized borax four drams, dissolved in two ounces of boiling water and mix; or if therapeutically more desirable, in place of the boracic acid and borax solution I mix with each gallon of the clear decoction three drams of crystallized carbolic acid as a chemical equivalent for the purpose stated. There are other chemical equivalents to the above, the essentials being that they shall be non-alcoholic, shall not affect the chemical action of the calendula, and shall prevent fungous growth and souring of the decoction.

I claim—

The medical compound of decoction of calendula, glycerine, and burnt alum with the addition of boracic acid and borax, substantially as and for the purpose set forth.

CHRISTIAN H. EYERMANN.

Witnesses:
SAML. KNIGHT,
BENJN. A. KNIGHT.